INVENTOR.
Ray E. King

United States Patent Office 2,985,981
Patented May 30, 1961

2,985,981

FISHING SINKER

Ray E. King, 726 Woodland Ave., Woodland, Calif.

Filed Aug. 14, 1959, Ser. No. 833,795

3 Claims. (Cl. 43—44.97)

This invention relates to sinkers such as are used on the ends of fishing lines, and particularly to those used by sports fishermen when casting or still fishing in relatively shallow waters, when the sinkers are apt to engage or rest on the bottom of the stream or other body of water.

The major objects of my invention are to provide a sinker of this nature so constructed that it will not tend to foul or become hung up on rocky or rough bottoms; one which will readily slide along and thus move free of any under-water surfaces with which it may come in contact; and one which will tend to remain in an upright position, with the adjacent attached end of the line facing upwardly and in position for a direct upward pull on the sinker when the latter is resting on a solid surface.

The improved sinker being practically snag-proof, fishing efficiency is increased, and the fisherman may fish without the interruptions caused by the sinker being snagged on the bottom, as is frequently the case with ordinary sinkers.

A further object of the invention is to provide a fishing sinker which is designed for ease and economy of manufacture.

It is also an object of the invention to provide a practical and reliable fishing sinker and one which will be exceedingly effective for the purpose for which it is designed.

These objects are accomplished by means of such structure and relative arrangement of parts as will fully appear by a perusal of the following specification and claims.

Figure 1:
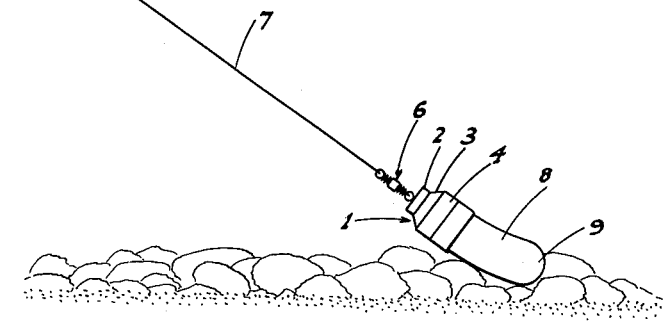
Fig. 1 is an elevation of my improved sinker as attached to a fishing line and as being pulled along a rocky or stony bottom while in contact therewith.
Figure 2:
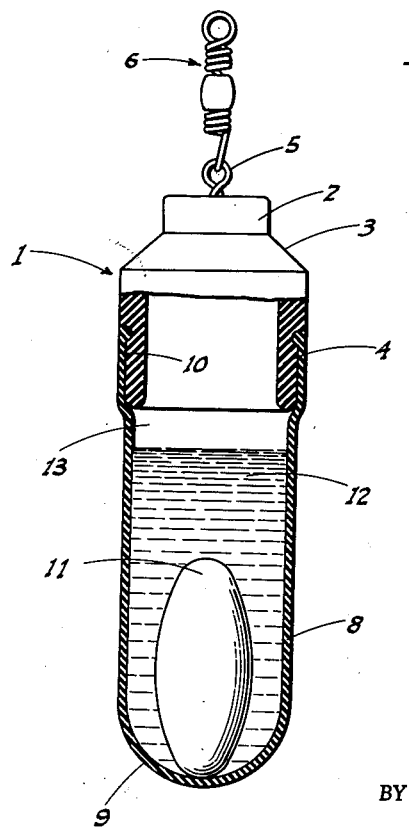
Fig. 2 is an enlarged elevation of the sinker in an upright position and mainly in section.

Referring now more particularly to the drawings, and to the characters of reference marked thereon, the sinker comprises a head or cap 1 made of some flexible material, such as semi-hard rubber or a suitable grade of plastic. This cap includes a solid head portion 2 having a downwardly and outwardly sloping side wall 3 from which an annular skirt 4 depends. The metal attachment eye 5 of a conventional swivel 6 is rigidly secured in and projects upwardly from the head centrally thereof; a fishing line 7 being of course attached to the upper eye of the swivel when the sinker is in use.

Surrounding and rigidly secured (as by cementing) on and depending from the skirt 4 in water and air-tight relation therewith, is the upper end portion of an elongated bag or sack 8 of generally cylindrical form, but having a round bottom 9 which of course closes the sack. The portion of the skirt engaged by the sack is preferably cut back for the thickness of the sack, as shown at 10, so that the cap 1 is flush with the sack and the latter does not tend to impede movement of the sinker through the water, nor does it tend to be "peeled" from the cap with such movement, nor its outer end to catch against some obstruction on the stream bottom.

The sack is made of a suitable grade of thin and very flexible yet tough rubber, and disposed within the sack is an elongated circular weight 11 of lead or the like. This weight is of generally longitudinal oval form in section, with rounded ends so that sharp edges which might chafe the sack are avoided. The diameter of the weight is materially less than the internal diameter of the sack, while its length is considerably greater than such internal diameter, so that the weight cannot assume a position crosswise and jam in the sack, even though it is free to shift or tilt therein from one side to the other.

Before the sack is secured to the cap a liquid 12, such as plain water, is placed in the sack to a depth sufficient to submerge the weight and nearly fill the sack, while leaving an air-filled space 13 in the sack and the lower portion of the cap of sufficient volume to cause the sinker, when submerged and without any pulling pressure on the line, to tend to assume an upright position in the water.

The liquid in the sack acts as a cushion or damper for the weight, without interfering with the shifting of position of the latter in the sack, as is necessitated by the positioning of the sinker in engagement with a rocky bottom, as indicated in Fig. 1. The liquid in the sack also of course serves to maintain said sack in a normal non-collapsed form, without preventing temporary deforming of the shape thereof as the sinker contacts any very uneven bottom surface, as shown in Fig. 1.

The sack, as well as the cap of the sinker, is purposely made slick and smooth on the outside surface, so that when the sinker becomes wet, said surface becomes slippery, and the sinker slides readily over rocks, etc., with which it may be in contact, with a minimum friction. This ease of movement of the sinker through the water is aided by the sloping side wall 3 of the cap 1.

The weight being separate from the sack, and the latter being initially separate from the cap, weights of varying sizes or weight may be used in sinkers having the same overall dimensions, so that the manufacturing problems—in providing a number of sinkers of different weight for the trade—are greatly reduced.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A fishing sinker comprising a head adapted for connection to a fishing line, an elongated flexible sack of circular form in section secured to and depending from the head, and a weight in the sack of circular form in section movably seated in the sack; the weight having a materially smaller diameter than the internal diameter of the sack and sufficiently longer than said internal diameter to be incapable of shifting to a position transversely of the sack.

2. A sinker, as in claim 1, with a liquid in the sack in a quantity sufficient to maintain the weight submerged.

3. A sinker, as in claim 1, in which the sack is a liquid-tight member and has air-tight connection with the head, and a liquid in the sack in a quantity sufficient to maintain the weight submerged while leaving an air chamber in the sinker above the liquid.

References Cited in the file of this patent

UNITED STATES PATENTS

| | | |
|---|---|---|
| 235,845 | Appleton | Dec. 28, 1880 |
| 2,605,576 | Young et al. | Aug. 5, 1952 |
| 2,741,864 | Shotton | Apr. 17, 1956 |

FOREIGN PATENTS

| | | |
|---|---|---|
| 21,334 | Great Britain | Sept. 18, 1909 |